Patented Jan. 8, 1952

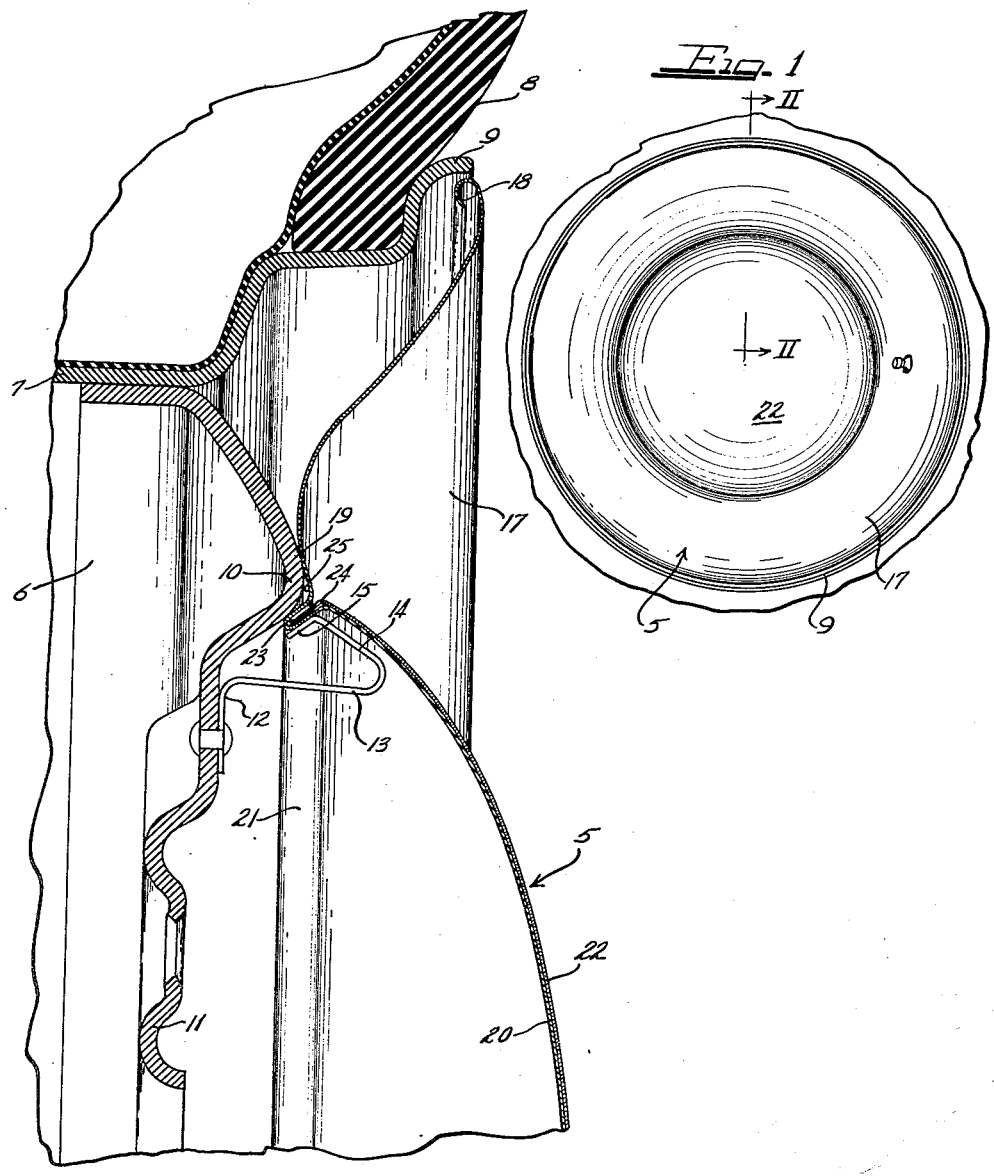

2,581,425

UNITED STATES PATENT OFFICE 2,581,425

WHEEL STRUCTURE

George Albert Lyon, Detroit, Mich.

Application February 15, 1949, Serial No. 76,477

5 Claims. (Cl. 301—37)

The present invention relates to improvements in wheel structures and more particularly concerns improvements in the protection and ornamentation of the outer sides of vehicle wheels.

An important object of the present invention is to provide an improved wheel structure having a novel cover assembled with the outer side thereof in substantially completely concealing relation thereto.

Another object of the invention is to provide an improved simplified full-disk type of wheel cover for disposition at the outer side of a vehicle wheel.

A further object of the invention is to provide a novel wheel cover which is of neat and attractive appearance, is inexpensive to make by mass production methods of manufacture, and lends itself to a variety of finishes or modes of finishing.

According to the general features of the present invention there is provided in a wheel structure including a wheel body having a generally axially outwardly extending annular reinforcing nose bulge and a tire rim supported by the wheel body, a cover for substantially completely concealing the outer side of the wheel including a one piece disk having an outer marginal trim ring portion of generally convex cross-section with the outer margin turned under and providing a finishing and reinforcing bead and the inner portion thereof being of concave cross-section providing a seat on its inner side against the reinforcing nose bulge of the wheel body, the central portion of the cover member being of convex crowned shape, a folded juncture joining the outer marginal portion and the crowned portion and extending generally axially and radially inwardly and bearing against the radially inner side of the nose bulge, and spring clips carried by the central portion of the wheel body and retainingly engaging said folded juncture and bearing generally axially inwardly and radially outwardly against said folded juncture to retain the cover seated on said nose bulge.

According to other general features of the invention there is provided a thin complementary convex ornamental cover over the crowned portion of the cover member and having a generally axially inwardly and radially inwardly extending marginal flange retainingly engaged within the juncture fold of the cover member.

Other objects, features and advantages of the present invention will be readily apparent from the following detailed description of a preferred embodiment thereof taken in conjunction with the accompanying drawings in which:

Figure 1 is a side elevational view of a wheel structure embodying the features of the present invention and Figure 2 is a radial sectional view on an enlarged scale taken substantially on the line II—II of Figure 1.

As shown on the drawings:

A cover 5 embodying the features of the present invention is preferably of the full disk-type which is of an over-all diameter sufficient to substantially completely conceal the outer side of a vehicle wheel including a wheel body 6 and a tire rim 7. The tire rim is preferably of the multi-flanged drop center type configurated to support a pneumatic tire and tube assembly 8 and having a generally radially and axially outwardly turned terminal flange 9. The wheel body is preferably formed as a heavy gauge sheet metal stamping which has an annular axially outwardly extending reinforcing intermediate nose bulge 10 defining a dished central bolt-on flange 11.

The wheel cover 5 is adapted to seat upon the nose bulge 10 of the wheel and conceals the wheel body 6 and substantially all of the tire rim 7, being retained in place by a series of generally goose neck retaining clips 12 supported on the bolt-on flange 11. Each of the clips has a generally axially outwardly extending body flange 13 and a generally radially outwardly and axially inwardly extending cam head flange 14 terminating in a generally radially inwardly and axially inwardly extending terminal retaining flange 15 which is disposed in operation close to the radially inner side of the peak of the wheel body nose bulge 10.

For concealing the tire rim 7 and the adjacent portion of the wheel body 6, the cover 5 has a wheel trim outer marginal integral portion 17 of generally convex cross-section and formed at its outer edge with an underturned, bead-like finishing and rigidifying flange 18. The marginal flange 18 is adapted to be received in spaced relation to the inner side of the terminal flange 9 of the tire rim and affords a space between the flange and the cover for ventilation purposes and egress of dirt that may find itself into the space between the cover and the wheel.

The radially inner portion of the outer marginal section 17 of the cover is formed of generally concave cross-section and provides a seating area 19 which in assembly seats against the nose bulge 10 and preferably at the radially outer side of the peak of the nose bulge. By thus seating on the nose bulge, the outer trim ring section of the cover is supported in spaced relation to the remainder of the radially outer portion of the wheel body and also in spaced relation to the tire rim 7.

The central portion of the wheel cover 5 is formed as a generally convex crown 20 of generally hubcap-like shape. At its outer margin the crown 20 joins integrally with the trim ring cover section 17 on a generally axially and radially inwardly extending juncture fold 21. This fold provides a retaining shoulder which at its radially and axially outer side bears against the reinforcing nose bulge 10 of the tire and preferably the radially inner side of the peak of the nose bulge and is clamped in place against the nose bulge by the retaining terminal flanges 15 of the retaining clips 12.

In applying the cover to the wheel, the cover is generally centered with respect to the wheel with the retaining shoulder juncture fold 21 resting against the cam flanges 14 of the clips and the cover is then manually pressed inwardly, the clips yielding until the retaining shoulder juncture fold 21 passes axially inwardly beyond the cam flanges 14 and snaps behind the retaining flanges 15 which clamp the fold against the nose bulge and thus hold the cover in place on the wheel. To remove the cover a pry-off tool (not shown) such as a screwdriver is inserted between the outer reinforced edge 18 of the cover and the tire rim terminal flange 9 and the tool is then manipulated to free the cover from the retaining clips 12.

An extremely ornamental effect can be obtained by making the entire cover including the marginal trim ring portion 17 and the crown portion from appropriate sheet metal such as stainless steel which can be polished to a bright luster over the entire surface thereof, or over any selected portion of the surface. On the other hand, the cover may be made from other appropriate materials such as brass and then plated in a portion thereof, or plated in one portion and enamelled or painted in another portion. In another manner of ornamenting the cover as shown, the principal cover member may be made from a relatively inexpensive material with the trim ring portion 17 painted or enamelled a suitable color such as white or a like color so as to simulate a white wall portion of the tire 8 and the crown portion may be covered with a complementary shell 22 of any appropriate material such as a plastic material, or a thin stainless steel material highly polished and providing a cap for the crown 20. The margin of the cap 22 has a flange 23 which is turned generally axially and radially inwardly and is engaged within the fold 21 whereby the cap is held permanently in place in the cover assembly and appears to form an integral part of the cover. The outer diameter of the cap affords an annular juncture rib projection 24 where the flange 23 merges with the body of the cap and substantially conceals the mouth of the fold by projecting radially outwardly thereover.

It will thus be apparent that the present invention provides a neat appearing, inexpensive, protective and ornamental cover for a vehicle wheel and which is simple and easy to apply or remove. In assembly the cover is firmly self-centered and adequately resists radial displacement or canting by reason of the firm engagement of the wheel body nose bulge within the groove 25 formed between the inwardly bowed marginal portion and the juncture fold of the cover.

I claim as my invention:

1. In a wheel structure including a wheel body having a generally axially outwardly extending annular reinforcing nose bulge and a tire rim supported by the wheel body, a cover for substantially completely concealing the outer side of the wheel including a one piece disk having an outer marginal trim ring portion of generally convex cross-section with the outer margin turned under and providing a finishing and reinforcing bead and the inner portion thereof being of concave cross-section providing a seat on its inner side against the reinforcing nose bulge of the wheel body, the central portion of the cover member being of convex crowned shape, a folded juncture joining the outer marginal portion and the crowned portion and extending generally axially and radially inwardly and bearing against the radially inner side of the nose bulge, spring clips carried by the central portion of the wheel body and retainingly engaging said folded juncture and bearing generally axially inwardly and radially outwardly against said folded juncture to retain the cover seated on said nose bulge.

2. In a wheel structure including a wheel body having a generally axially outwardly extending annular reinforcing nose bulge and a tire rim supported by the wheel body, a cover for substantially completely concealing the outer side of the wheel including a one piece disk having an outer marginal trim ring portion of generally convex cross-section with the outer margin turned under and providing a finishing and reinforcing bead and the inner portion thereof being of concave cross-section providing a seat on its inner side against the reinforcing nose bulge of the wheel body, the central portion of the cover member being of convex crowned shape, a folded juncture joining the outer marginal portion and the crowned portion and extending generally axially and radially inwardly and bearing against the radially inner side of the nose bulge, spring clips carried by the central portion of the wheel body and retainingly engaging said folded juncture and bearing generally axially inwardly and radially outwardly against said folded juncture to retain the cover seated on said nose bulge, and a thin complementary convex ornamental cover over substantially all of the crowned portion of the cover member and having a generally axially inwardly and radially inwardly extending marginal flange retainingly engaged within the juncture fold of the cover member.

3. In a one piece cover for the outer side of a vehicle wheel including a tire rim and a wheel body having a generally axially outwardly extending intermediate reinforcing nose bulge, a trim ring outer marginal portion for substantially concealing the tire rim and the wheel body at the radially outer side of the nose bulge and a crown portion for concealing the central portion of the wheel body, an integral juncture fold connecting the trim ring marginal portion and the crown portion, the trim ring marginal portion adjacent said fold extending generally radially and axially outwardly and providing with the fold a generally axially inwardly opening groove, the radially outer portion of which is provided by the body of the marginal portion and radially inner side of which is provided by the marginal portion side of the fold, said groove sides being respectively adapted to engage the radially outer side of the nose bulge and the radially inner side of the nose bulge adjacent the peak of the nose bulge thus to maintain the cover centered on the wheel.

4. In a wheel structure including a tire rim and a wheel body having an annular intermediate axially outwardly protruding nose bulge, a cover for the outer side of the wheel including a trim ring portion and a central crown portion and an integral connecting fold uniting said portions in one unit, the trim ring portion adjacent the fold having an axially inwardly directed portion spaced radially outwardly from the fold and combining with the fold to provide an axially inwardly opening seating groove receptive of the peak of said nose bulge to maintain the cover centered on the wheel.

5. In a wheel structure including a tire rim and a wheel body having an annular intermediate axially outwardly protruding nose bulge, a cover for the outer side of the wheel including a trim ring portion and a central crown portion and an integral connecting fold uniting said portions in one unit, the trim ring portion adjacent the fold having an axially inwardly directed portion spaced radially outwardly from the fold and combining with the fold to provide an axially inwardly opening seating groove receptive of the peak of said nose bulge to maintain the cover centered on the wheel, and a series of retaining clips supported by the central portion of the wheel body and having goose neck retaining portions engaging the crown side of the fold and holding the cover on the wheel.

GEORGE ALBERT LYON.

REFERENCES CITED

The following references are of record in the file of this patent:

UNITED STATES PATENTS

| Number | Name | Date |
|--------|------|------|
| 2,189,744 | Lyon | Feb. 6, 1940 |
| 2,190,669 | Lyon | Feb. 20, 1940 |
| 2,421,385 | Lyon | June 3, 1947 |